United States Patent [19]

Kinkade et al.

[11] 4,143,560

[45] Mar. 13, 1979

[54] TRANSMISSION SHIFT CONTROL

[75] Inventors: Charles E. Kinkade, Dryden; Robert O. Morgner, Lake Orion; Harold L. Sharp, Farmington, all of Mich.

[73] Assignee: General Motors Corporation, Detroit, Mich.

[21] Appl. No.: 843,559

[22] Filed: Oct. 19, 1977

[51] Int. Cl.² .................. G05G 9/16; F16H 57/06
[52] U.S. Cl. .................................. 74/473 R; 74/476
[58] Field of Search ............... 74/473 R, 473 P, 476, 74/477

[56] References Cited

U.S. PATENT DOCUMENTS

| 2,094,976 | 10/1937 | Bachman | 74/473 R |
| 2,250,820 | 7/1941 | Backus | 74/473 R |
| 3,016,758 | 1/1962 | Keller | 74/473 R |

FOREIGN PATENT DOCUMENTS 946867  12/1948  France ............................. 74/473 R Primary Examiner—Allan D. Herrmann
Attorney, Agent, or Firm—Donald F. Scherer

[57] ABSTRACT

A manual transmission shift control arrangement wherein a shift shaft is movable by a shift control lever into and out of a transmission to one of three REVERSE, FIRST/SECOND, and THIRD/FOURTH selector positions, and then rotatable in one direction into REVERSE, FIRST or THIRD, or in the opposite direction into SECOND or FOURTH ratio positions, depending upon the selector position, by two cables and associated levers operatively connected therebetween.

3 Claims, 6 Drawing Figures

TRANSMISSION SHIFT CONTROL

This invention relates generally to transmission shift controls and, more particularly, to dual cable type shift control arrangements.

Accordingly, a general object of the invention is to provide an improved dual cable type shift control arrangement.

Another object of the invention is to provide an improved manual transmission shift control arrangement wherein movement of a shift control lever laterally moves a shift shaft axially into or out of a transmission via a pivotable cradle member, a pivotable link, a selector cable and a pivotable selector lever into one of three REVERSE, FIRST/SECOND, and THIRD/FOURTH selector positions, and movement of the shift control lever longitudinally rotates the shift shaft in one direction into REVERSE, FIRST or THIRD, or in the opposite direction into SECOND or FOURTH ratio positions, via a shift cable and a pivotable shift lever.

A further object of the invention is to provide a manual transmission shift control arrangement including a shift control lever pivotable about an intermediate point thereof and extended through a slotted cradle member such that the cradle is pivoted by lateral movement of the shift control lever and the shift control lever may be moved longitudinally relative thereto. A selector cable is connected between a link pivotally connected to the cradle member and a selector lever pivotally connected to a shift shaft for axially moving the shift shaft into or out of a transmission to designated selector positions in response to lateral movements of the shift control lever. A shift cable is connected between the shift control lever and a transmission shift lever for rotating the shift shaft into designated shift ratio positions.

Still another object of the invention is to provide a control mechanism for a transmission having a casing enclosing gear means and including a floor-mounted housing, a cradle member swingingly mounted in the housing and having a slot formed across the bottom thereof, a shift control lever swivably mounted at an intermediate portion thereof in the housing and having the lower end portion thereof extended through the slot, a link pivotally mounted in the housing and having one end thereof pivotally connected to the cradle member for movement therewith, a coil spring mounted around the shift control lever and preloaded between the top surface of the housing and retainer means formed on the shift control lever, a REVERSE inhibitor formed in the housing for preventing movement therepast of the shift control lever until the shift control lever is pressed downwardly against the force of the coil spring, a shift shaft extending through the casing and operatively connected to the gear means for establishing a selected gear ratio in the transmission, a selector lever pivotally mounted on the casing and pivotally connected to the shift shaft for axially moving the shift shaft into and out of the casing, a shift lever secured to the shift shaft for rotating the shift shaft, a flexible selector cable connected between the other end of the link and the selector lever for selectively axially moving the shift shaft to one of three REVERSE, FIRST/SECOND, and THIRD/FOURTH selector positions in response to movement of the shift control lever and the cradle member, and a flexible shift cable connected between the lower end of the shift control lever and the shift lever for selectively rotating the shift shaft in one direction into REVERSE, FIRST or THIRD, or in the other direction into SECOND or FOURTH gear ratio positions, depending upon the axial setting of the shift shaft in response to movements of the shift control lever along the slot in the cradle member.

These and other objects and advantages of the invention will be apparent when reference is made to the following description and accompanying drawings wherein.

Figure 1:
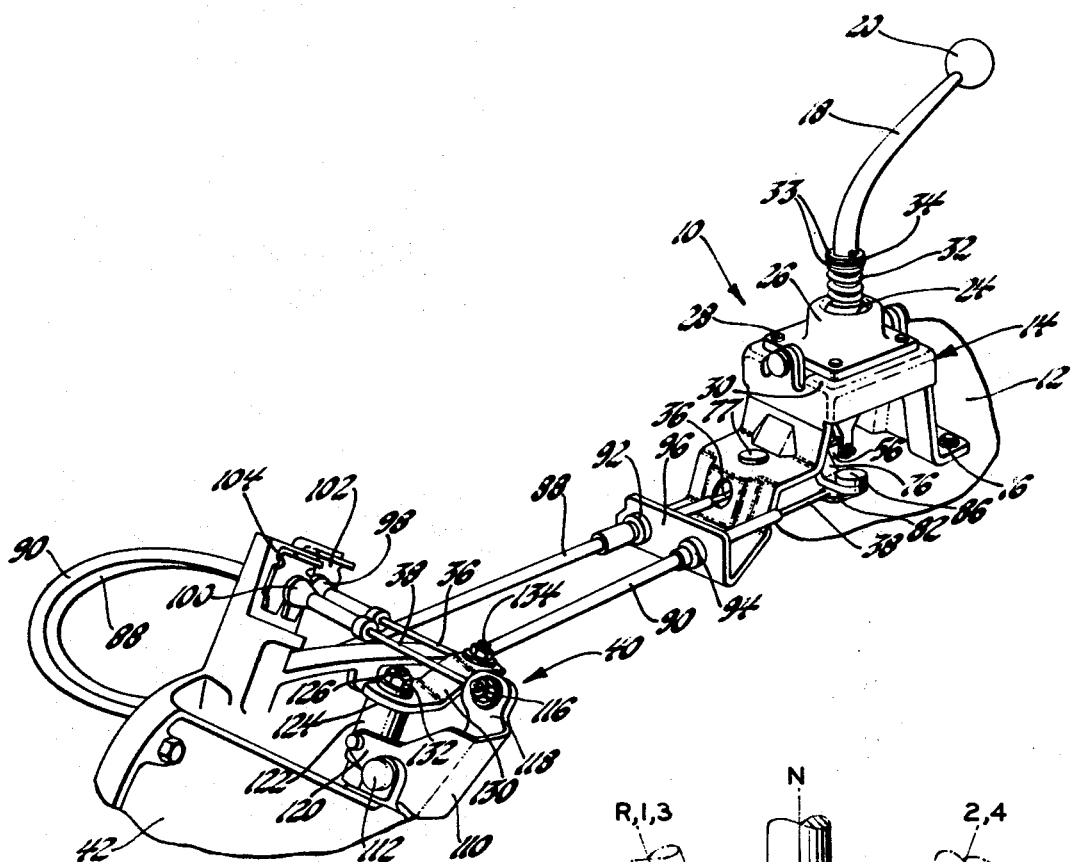
FIG. 1 is a perspective view of a floor mounted manual transmission shift control arrangement embodying the invention.

Referring now to the drawings in greater detail, FIG. 1 illustrates a four-speed shift control arrangement 10 mounted on the floor 12 of a motor vehicle. The shift control arrangement 10 includes a stamped housing 14 secured to the floor 12 by four bolts 16. A manual shift control lever 18, having a knob 20 mounted on the outer end thereof, has the lower end portion 22 extended through an opening 24 formed in the top of a cover portion 26 secured by rivets 28 to a wall 30 of the housing 14. A coil spring 32 is mounted around the shift control lever 18 and preloaded between the top surface of the cover portion 26 and a retainer flange formed by two washers 33 (FIG. 2) and an intermediate "O" ring 34. A pin 35 mounted laterally through the lever 18 retains the upper washer 33 in place.

A pair of flexible cables, one a shift cable 36 and the other a selector cable 38 are operatively connected, in a manner to be described, to the lower end portion 22 of the manual shift control lever 18, within the housing 14. The cables 36 and 38 extend to a shift mechanism 40 so as to be responsive to selected lateral and longitudinal movements of the shift control lever 18 through the pattern illustrated in FIG. 6 for establishing any of REVERSE, FIRST, SECOND, THIRD, and FOURTH ratios within a transmission having a housing or casing 42.

Figure 4:
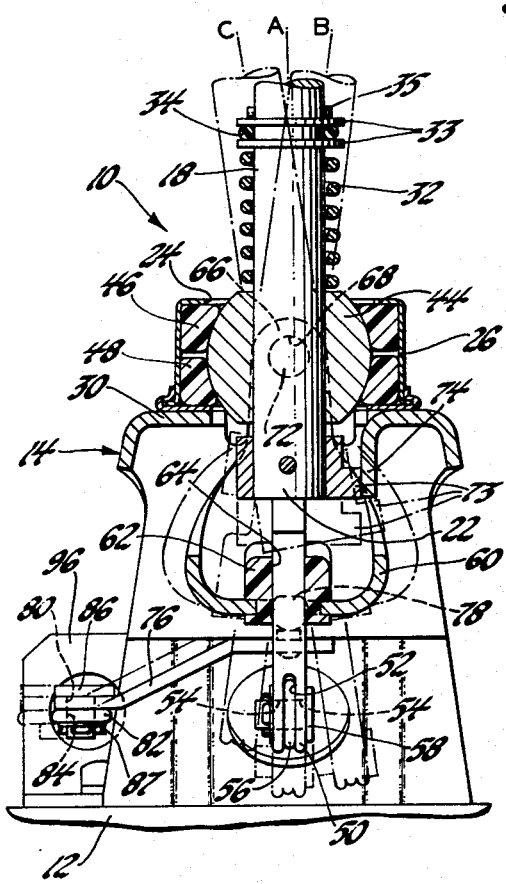
FIG. 4 is a cross-sectional view taken along the plane of the line 4—4 of FIG. 3, and looking in the direction of the arrows.
Figure 5:
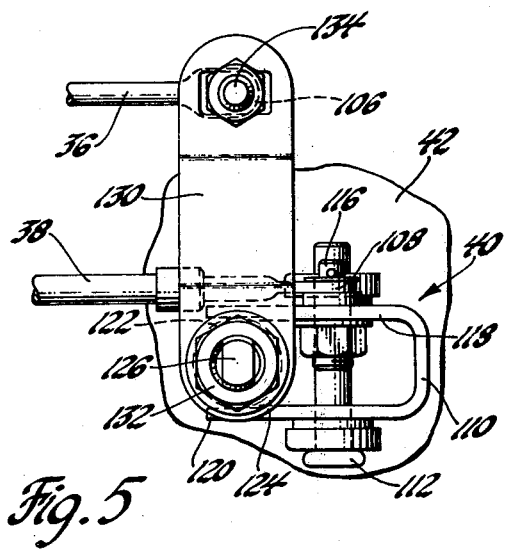
FIG. 5 is an enlarged plan view of a portion of the arrangement shown in FIG. 1.

As shown in FIG. 4, a ball-like member 44 is formed around the lever 18 and mounted in oppositely disposed semispherically recessed seats 46 and 48 within the cover portion 26. The end 50 of the shift lever 18 has a lateral slot 52 formed therethrough, with oppositely disposed aligned openings 54 communicating with the slot 52. A flattened end 56 of the shift cable 36 is pivotally mounted in the slot 52 by a pivot pin 58 extended through the openings 54 and the flattened end 56.

A cradle or swing member 60 (FIGS. 2 and 4) supports a lateral body member 62 having a slot 64 formed across the full length thereof. The cradle member includes oppositely disposed, upwardly extending arms 66 formed at the ends thereof, with aligned openings 68 formed adjacent the upper edges of the respective arms 66 for mounting adjacent oppositely disposed, fixed tabs 70 extending upwardly from the housing 14. A pivot pin or rivet 72 mounted through each tab 70 and adjacent opening 68 in each arm 66 permits the cradle member 60 to be selectively pivoted or swung in response to movements of the shift control lever 18 laterally through NEUTRAL. The shift control lever 18 is slidably mounted through the slot 64. A projection 73 is formed on the shift lever 18 intermediate the lateral body member 62 and the ball-like member 44.

A stop member or reverse inhibitor 74 (FIGS. 3 and 4) is formed in the housing 14 adjacent the projection 73, preventing the latter's movement therepast until the manual shift control lever 18 is pressed downwardly against the force of the spring 32, permitting the movement of the shift control lever 18 through the neutral plane into its REVERSE position.

Figure 2:
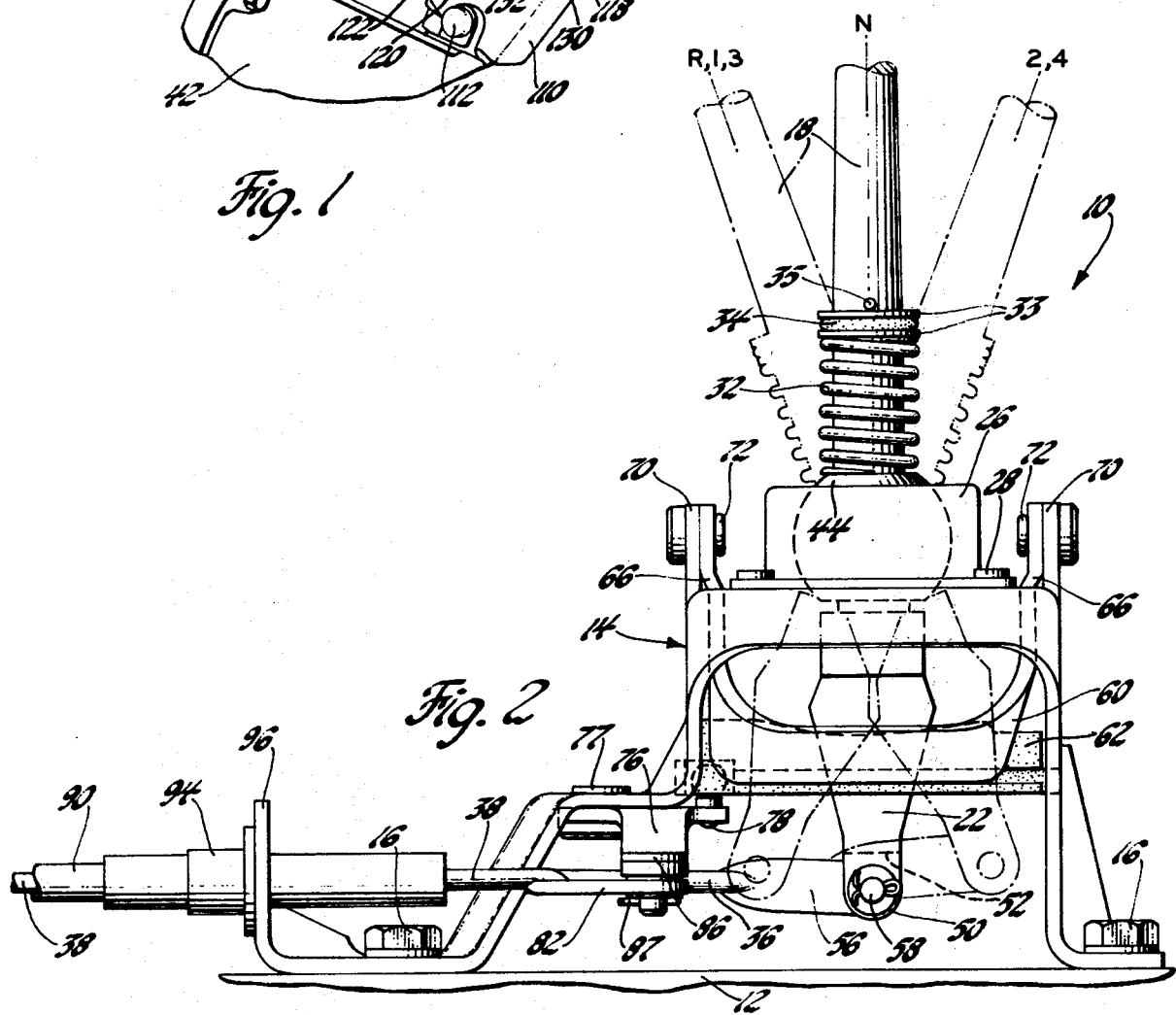
FIG. 2 is an enlarged fragmentary side elevational view of a portion of the arrangement shown in FIG. 1.
Figure 3:
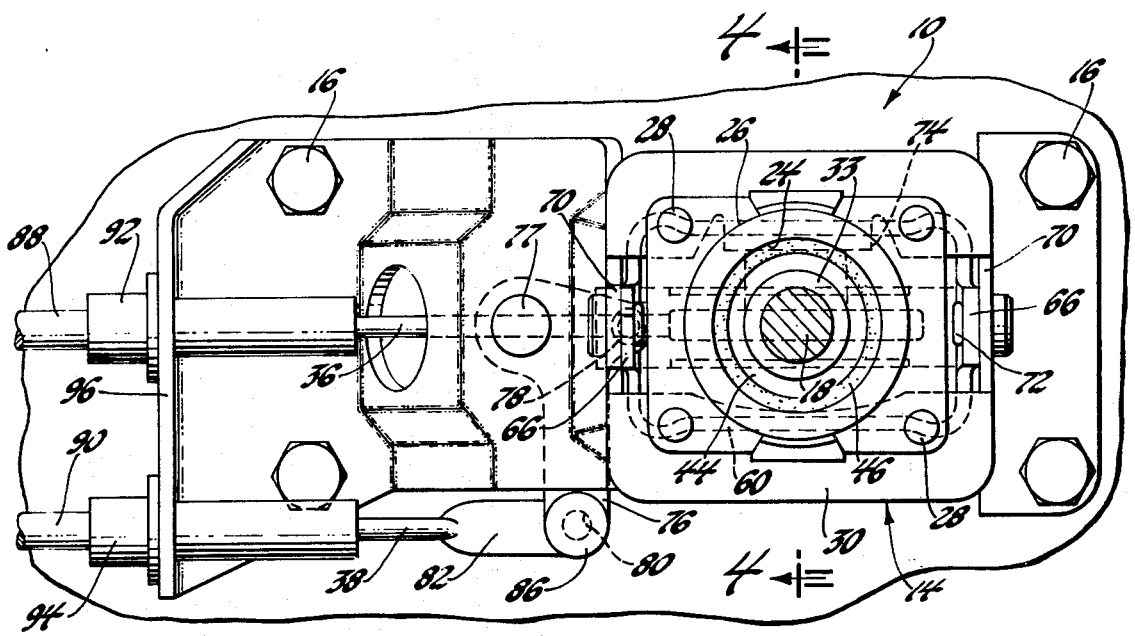
FIG. 3 is an enlarged fragmentary plan view of the portion shown in FIG. 2.

As may be noted in FIGS. 2–4, a "T" shaped link 76 is pivotable about a pivot pin 77 located at the left end thereof, as seen in FIG. 3, with the right end thereof pivotably connected by suitable pin means 78, to the adjacent end portion of the cradle member 60. An opening 80 is formed through the end of the vertical leg (FIG. 3) of the link 76. A flattened end 82 of the selector cable 38 includes an opening 84. The latter is aligned with the opening 80 such that a pivot pin 86 is mounted through the two openings and retained therein by a cotter pin 87 for pivotally connecting the cable 38 to the link 76.

The cables 36 and 38 extend from the housing 14 to the shift mechanism 40, through sheaves 88 and 90 (FIG. 1) mounted between a first pair of connectors 92 and 94 secured in a support flange 96 formed on the housing 14, and a second pair of connectors 98 and 100 secured in respective yokes 102 and 104 mounted on the transmission housing 42, terminating in respective flattened ends 106 and 108.

An "L" shaped selector lever 110 is secured at the corner portion thereof by a fixed pivot pin 112 to the transmission housing 42. The flattened end 108 of the selector cable 38 is pivotally connected by a pivot pin 116 to the end of one leg 118 of the selector lever 110. The end of the other leg 120 of the selector lever 110 is pivotally connected to an intermediate portion of a shift shaft 122 extending into the transmission 42. A shoulder 124 and threaded extension 126 are formed on the outer end of the shift shaft 122.

A transmission shift lever 130 is secured at one end thereof around the threaded extension 126, against the shoulder 124 of the shift shaft 122 by a nut 132. The flattened end 106 of the shift cable 36 is pivotally connected by a pivot pin 134 to the other end of the shift lever 130. Thus, it's apparent that, in general, actuation of the selector cable 38 moves the shift shaft 122 via the selector lever 110 into or out of the transmission 42 to selected axial positions comparable to points A, B and C of the FIG. 6 shift pattern, while actuation of the shift cable 36 rotates the shift shaft 122 via the shift lever 130 to selected shift positions R, 1, 2, 3 and 4.

Figure 6:
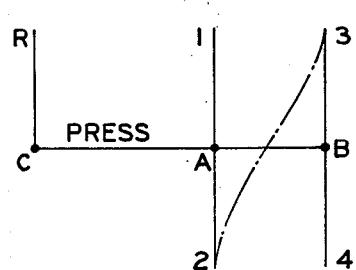
FIG. 6 is a diagrammatic view showing operational characteristics of the invention.

More specifically, movement of the manual shift control lever 18 laterally across NEUTRAL, as viewed from the operator's seat and shown in FIG. 4, i.e., across the plane A–B of FIG. 6 from A to B, pivots the cradle member 60 about the pivot pins 72. This movement actuates the selector cable 38 via the pivotable T-shaped link 76, as is apparent from FIG. 3. As a result, the selector lever 110 is pivoted in a clockwise direction about the pivot pin 112 (FIG. 1), thereby establishing the axial select position of the shift shaft 122 in one of the 1–2 or 3–4 axial positions corresponding to points A and B, respectively. For REVERSE, as indicated above, pressing the manual shift control lever 18 downwardly to compress the spring 32, permits the shift lever to be moved across the plane A–C, inasmuch as the projection 73 (FIG. 4) is now positioned below the reverse inhibitor 74 and, thus, may be moved past the reverse inhibitor 74 to position C. Such movement serves to move the selector cable 38 so as to pivot the selector lever 110 in a counterclockwise direction about the pivot pin 112, as viewed in FIG. 1, and thereby cause the shift shaft 122 to extend further into the transmission 42, to the R position.

Now, once position A, B or C (FIGS. 4 and 6) is selectively established, movement of the manual shift control lever 18 forwardly, as viewed from the operator's seat, i.e., leftwardly in FIG. 2, directly actuates the shift cable 36 connected to the lower end 50 of the shift control lever 18. The shift cable 36, in turn, pivots the transmission shift lever 130, thereby rotating the shift shaft 122 into one of R, 1 or 3 ratio positions, depending upon the selected axial position of the shift shaft 122 corresponding to the points C, A and B of FIG. 6. Rearward movement of the shift control lever 18 would rotate the shift shaft 122 into one of 2 or 4 ratio positions from the respective points A or B.

It is interesting to note that, once the shift lever 18 and shift shaft 122 have been shifted into SECOND by the above procedure, for a particular transmission application, it may be possible to shift substantially directly to THIRD, along the path shown in the dash line of FIG. 6, without traversing longitudinally back to point A and thence laterally to point B, and once again longitudinally to the THIRD ratio position. The same would hold true for downshifting from THIRD to SECOND. Such action is a feature of the transmission, and not a feature of the shift control arrangement.

It should be apparent that the above described arrangement provides a compact, simplified and efficient dual cable type shift control means for a manual transmission.

While but one embodiment of the invention has been shown and described, other modifications thereof are possible.

The embodiments of the invention in which an exclusive property or privilege is claimed are defined as follows:

1. In a control mechanism for a transmission having a casing enclosing gear means, the combination comprising a housing, a cradle member swingingly mounted in said housing and having a slot formed across the bottom thereof, a shift control lever swivably mounted at an intermediate portion thereof in said housing and having the lower end portion thereof extended through said slot, a link pivotally mounted in said housing and having one end thereof pivotally connected to said cradle member for movement therewith, a shaft extending through said casing and operatively connected to said gear means for establishing a selected gear ratio in said transmission, a first lever pivotally mounted on said casing and pivotally connected to said shaft for axially moving said shaft into and out of said casing, a second lever secured to said shaft for rotating said shaft, a first flexible cable connected between the other end of said link and said first lever for selectively axially moving said shaft to one of a predetermined number of axial positions in response to movement of said shift control lever and said cradle member, and a second flexible cable connected between the lower end of said shift control lever and said second lever for selectively rotating said shaft in one direction into one of a predetermined number of positions, or in the other direction into one of a predetermined number of positions, depending upon the axial setting of said shaft in response to movements of said shift control lever along said slot in said cradle member.

2. In a control mechanism for a transmission having a casing enclosing gear means, the combination comprising a floor-mounted housing, a cradle member swingingly mounted in said housing and having a slot formed across the bottom thereof, a shift control lever swivably mounted at an intermediate portion thereof in said housing and having the lower end portion thereof extended through said slot, a link pivotally mounted in said housing and having one end thereof pivotally connected to said cradle member for movement therewith, a coil spring mounted around said shift control lever and preloaded between the top surface of said housing and retainer means formed on said shift control lever, a REVERSE inhibitor formed in said housing for preventing movement therepast of said shift control lever until said shift control lever is pressed downwardly against the force of the coil spring, a shift shaft extending through said casing and operatively connected to said gear means for establishing a selected gear ratio in said transmission, a selector lever pivotally mounted on said casing and pivotally connected to said shift shaft for axially moving said shift shaft into and out of said casing, a shift lever secured to said shift shaft for rotating said shift shaft, a flexible selector cable connected between the other end of said link and said selector lever for selectively axially moving said shift shaft to one of at least two selector positions in response to movement of said shift control lever and said cradle member, and a flexible shift cable connected between the lower end of said shift control lever and said shift lever for selectively rotating said shift shaft in one direction into one of at least two gear ratio positions, or in the other direction into one of at least two gear ratio positions, depending upon the axial setting of said shift shaft in response to movements of said shift control lever along said slot in said cradle member.

3. In a control mechanism for a transmission having a casing enclosing gear means, the combination comprising a floor-mounted housing, a cradle member swingingly mounted in said housing and having a slot formed across the bottom thereof, a shift control lever swivably mounted at an intermediate portion thereof in said housing and having the lower end portion thereof extended through said slot, a link pivotally mounted in said housing and having one end thereof pivotally connected to said cradle member for movement therewith, a coil spring mounted around said shift control lever and preloaded between the top surface of said housing and retainer means formed on said shift control lever, a REVERSE inhibitor formed in said housing for preventing movement therepast of said shift control lever until said shift control lever is pressed downwardly against the force of the coil spring, a shift shaft extending through said casing and operatively connected to said gear means for establishing a selected gear ratio in said transmission, a selector lever pivotally mounted on said casing and pivotally connected to said shift shaft for axially moving said shift shaft into and out of said casing, a shift lever secured to said shift shaft for rotating said shift shaft, a flexible selector cable connected between the other end of said link and said selector lever for selectively axially moving said shift shaft to one of three REVERSE, FIRST/SECOND, and THIRD/FOURTH selector positions in response to movement of said shift control lever and said cradle member, and a flexible shift cable connected between the lower end of said shift control lever and said shift lever for selectively rotating said shift shaft in one direction into REVERSE, FIRST or THIRD, or in the other direction into SECOND or FOURTH gear ratio positions, depending upon the axial setting of said shift shaft in response to movements of said shift control lever along said slot in said cradle member.

* * * * *